United States Patent
Danielsson et al.

(10) Patent No.: US 10,343,241 B2
(45) Date of Patent: Jul. 9, 2019

(54) ROBOT CELL FOR SEPARATING A NAILED PALLET PART FROM A PALLET

(71) Applicant: Yaskawa Nordic AB, Torsås (SE)

(72) Inventors: Per Danielsson, Klippan (SE); Carl-Johan Hallengren, Ramdala (SE)

(73) Assignee: Yaskawa Nordic AB (SE)

( * ) Notice: Subject to any disclaimer, the term of this patent is extended or adjusted under 35 U.S.C. 154(b) by 0 days.

(21) Appl. No.: 15/503,581

(22) PCT Filed: Aug. 13, 2014

(86) PCT No.: PCT/SE2014/050935
§ 371 (c)(1),
(2) Date: Feb. 13, 2017

(87) PCT Pub. No.: WO2016/024891
PCT Pub. Date: Feb. 18, 2016

(65) Prior Publication Data
US 2017/0225281 A1    Aug. 10, 2017

(51) Int. Cl.
*B23P 19/04*    (2006.01)
*B23Q 11/10*    (2006.01)
(Continued)

(52) U.S. Cl.
CPC .......... *B23P 19/041* (2013.01); *B23D 47/045* (2013.01); *B23D 59/006* (2013.01);
(Continued)

(58) Field of Classification Search
CPC .. B23P 19/041; Y10S 83/943; B23Q 11/1007; B23Q 11/10–1092; B23Q 7/047; B23D 59/02; B23D 51/02; B23D 45/06–068; B23D 47/02; B23D 47/025; B23D 59/006; B23D 59/00; B23D 59/04; B23D 47/04; B23D 47/045; Y10T 83/0443; Y10T 83/0453; Y10T 83/242; Y10T 83/263; Y10T 83/283; Y10T 83/293; B26D 1/143; B26D 1/1435; B26D 1/15;
(Continued)

(56) References Cited

U.S. PATENT DOCUMENTS

| | | | | |
|---|---|---|---|---|
| 3,008,462 A | * | 11/1961 | Williams | ............... B24B 27/06 125/13.01 |
| 3,081,586 A | * | 3/1963 | Gersbach | ............. B28D 5/0058 125/13.01 |
| 3,141,378 A | * | 7/1964 | Rabinow | ............ B23Q 11/0017 407/11 |
| 4,241,495 A | | 12/1980 | Wakeem | |
| 4,976,251 A | * | 12/1990 | Smith | .................. B23D 47/025 125/13.01 |

(Continued)

FOREIGN PATENT DOCUMENTS

| GB | 398976 A | 9/1933 |
|---|---|---|
| WO | WO 2004/052739 A1 | 6/2004 |
| WO | WO 2012/067581 A1 | 5/2012 |

*Primary Examiner* — Evan H Macfarlane
(74) *Attorney, Agent, or Firm* — Condo Roccia Koptiw LLP

(57) ABSTRACT

A robot cell (1) may include a multi axis robot arm (3), which terminates in a gripper (4) arranged to handle a pallet (2), and a sawing device (10), which is arranged to separate a nailed pallet part from a pallet (2) handled by said gripper (4). The sawing device (10) may include a saw blade immersed in a liquid bath, which is contained in a trough (11) of the sawing device (10). Such that separation of said nailed pallet part is performed in a liquid environment.

4 Claims, 2 Drawing Sheets

(51) Int. Cl.
*B23D 59/02* (2006.01)
*B23D 59/00* (2006.01)
*B23D 47/04* (2006.01)
*B23Q 7/04* (2006.01)
*B65G 15/48* (2006.01)
*B65G 45/12* (2006.01)

(52) U.S. Cl.
CPC .............. *B23D 59/02* (2013.01); *B23Q 7/047* (2013.01); *B23Q 11/1007* (2013.01); *B65G 15/48* (2013.01); *B65G 45/12* (2013.01); *B23D 47/04* (2013.01)

(58) Field of Classification Search
CPC ............ B26D 1/151; B26D 2007/0018; B26D 7/0658; B26D 7/088; B26D 7/20; B26D 7/208; B26D 7/18; B26D 7/1845; B26D 7/22; B28D 1/04–048; B28D 7/02
USPC .................................. 125/13.01–15
See application file for complete search history.

(56) References Cited

U.S. PATENT DOCUMENTS

| | | | |
|---|---|---|---|
| 5,013,884 A | 5/1991 | Hahn | |
| 6,253,757 B1* | 7/2001 | Benson | B23D 47/025 125/11.22 |
| 6,494,198 B1* | 12/2002 | Chen | B23D 47/025 125/13.01 |
| 2004/0182214 A1* | 9/2004 | Courtois | B23D 59/008 83/365 |
| 2006/0242820 A1* | 11/2006 | Townsend | B23P 19/041 29/703 |
| 2008/0295822 A1* | 12/2008 | Gifford | B23D 47/02 125/38 |
| 2011/0197729 A1 | 8/2011 | Cosgrove et al. | |
| 2012/0167733 A1* | 7/2012 | Lee | B28D 5/0076 83/169 |
| 2014/0157965 A1* | 6/2014 | Simon | B23D 47/025 83/98 |

* cited by examiner

ROBOT CELL FOR SEPARATING A NAILED PALLET PART FROM A PALLET

CROSS REFERENCE TO RELATED APPLICATIONS

This application is the National Stage Entry under 35 U.S.C. § 371 of Patent Cooperation Treaty Application No. PCT/SE2014/050935, filed Aug. 13, 2014, the contents of which are hereby incorporated by reference herein.

TECHNICAL FIELD

The present invention concerns a robot cell comprising a multi axis robot arm, which terminates in a gripper arranged to handle a pallet, and a sawing device, which is arranged to separate a nailed pallet part from a pallet handled by said gripper.

Pallets to be handled by means of said gripper usually comprise a deck layer, which includes parallel deck boards arranged at given distances in relation to each other, a bottom layer, which is in parallel with the deck layer and includes parallel bottom boards, which are arranged at given distances in relation to each other, and an intermediate layer, which is arranged between the deck layer and the bottom layer and includes spacer means, which at given distances in relation to each other are connected to the deck layer and the bottom layer. There are, however, more simply designed pallets which can be handled by means of said gripper and comprise only a top layer onto spaced apart stringers.

Obviously pallets that fit the description given above can vary in style and size depending on the intended use and geographic location. They are usually made of wood, but other materials, such as composite materials, exist too. Nailing is the most common way of connecting pallet parts with each other. There are however other similar ways too, such as screwing or stapling, which are meant to be comprised by the term nailing as used in this context.

PRIOR ART

In the international patent application WO 2004/052739 A1 a robot cell according to the preamble is revealed. The robot cell describe in said application comprises a sawing station, into which a damaged pallet is fed by means of a robot in order to free a damaged pallet part by separating it from the remainder of the pallet.

The described sawing station comprises a band saw, which runs horizontally and covers an area sufficiently large to be able to cut an entire lengthwise oriented board off a treated pallet. In other words, the robot only has to move a pallet depthwise while cutting is performed.

OBJECT OF THE INVENTION

Although the known solution reveals a rather simple a straightforward disassembly method, it suffers from the problem that cutting by means of a saw can result in sparking, especially when the saw comes into contact with a metallic piece, such as a nail, screw or staple. Sparks provoked in that way can from time to time lead to setting saw dust or even an entire pallet on fire, which of course is highly problematic in a factory where a great number of potentially inflammable pallets are stored.

Further the known solution tends to suffer from bad work conditions, because the saw dust produced is prone to whirl about and deposit everywhere and noise levels are rather high.

In the light of the above an object of the present invention is to improve the prior art solution such that formation of sparks and dust is avoided.

BRIEF SUMMARY OF THE INVENTION

In a robot cell comprising a multi axis robot arm, which terminates in a gripper arranged to handle a pallet, and a sawing device, which is arranged to separate a nailed pallet part from a pallet handled by said gripper, the above object is achieved in that said sawing device comprises a saw blade immersed in a liquid bath, which is contained in a trough of said sawing device, such that separation of said nailed pallet part is performed in a liquid environment.

The rather simple but in no way by prior art anticipated measure to have a saw blade operate in a liquid environment, does reliably solve previous problems and is beneficial from a noise point of view as well, since the liquid muffles sound.

Preferably said saw blade is arranged stationary in said trough. This is advantageous since it in that way is easier to coordinate movement of the robot arm in relation to the saw blade and to predict a suitable liquid level inside the trough.

Preferably said trough is elongate and said saw blade arranged in a central part thereof. This is advantageous since it makes it possible avoid dead space beyond the saw blade and thus to minimize size of the trough.

Preferably said saw blade is a circular saw blade, wherein said trough has a length exceeding twice a maximum pallet length. For a circular saw blade a trough of that length is required in order to enable a single saw blade to easily cut off all nailed parts along a pallet.

Preferably a baffle is horizontally arranged in said trough, said baffle having a central orifice, through which an upper part of said saw blade extends to perform said separation. The baffle serves the purpose of keeping separated parts of a pallet in a top area of the trough where said parts are easy to control.

Preferably said baffle is shorter than said trough, such that a circulating liquid stream surfaces from below said baffle through an inlet upstream of said saw blade at a first end of said trough and dives below said baffle through an outlet downstream of said saw blade at a second end of said trough. Such a liquid stream tends to move a separated pallet part and floating saw dust in a certain direction, which facilitates pick up and removal of these from the trough.

Preferably a belt conveyor is arranged to pick up a floating, separated pallet part of a pallet at said second end of said trough and to move it away therefrom. A belt conveyor, which preferably is inclined and has a low starting point below a liquid surface at said second end, forms a simple but reliable means to remove a separated pallet part and floating saw dust as well from the trough.

Preferably a scraper is arranged to free a bottom strand of said belt conveyor from wet, adhering saw dust outside of said trough. A scraper does also form a simple and reliable means, this time to hinder saw dust collected by the conveyor belt to return to the trough, which otherwise would tend to clog quickly.

Preferably said belt conveyor comprises a belt made of a liquid pervious mesh material. This is advantageous since it helps saving liquid by keeping liquid in the trough instead of letting it drop off a bottom strand of said belt conveyor outside of the trough.

Preferably the robot cell according to the invention comprises a cutting device, which comprises knives and is arranged alongside said sawing device in order to separate another nailed pallet part from a pallet handled by said gripper. By arranging a cutting device with knives in addition to the sawing device, a far more versatile robot cell is created able to cope with more parts of a pallet than a robot cell comprising just a sawing device would do.

BRIEF SUMMARY OF THE DRAWINGS

In the schematic drawings

DETAILED DESCRIPTION OF A PREFERRED EMBODIMENT

In the following a preferred embodiment of the present invention is described with reference being had to the accompanying drawings, in which like reference numbers are used for like parts in both drawing figures.

Figure 1:
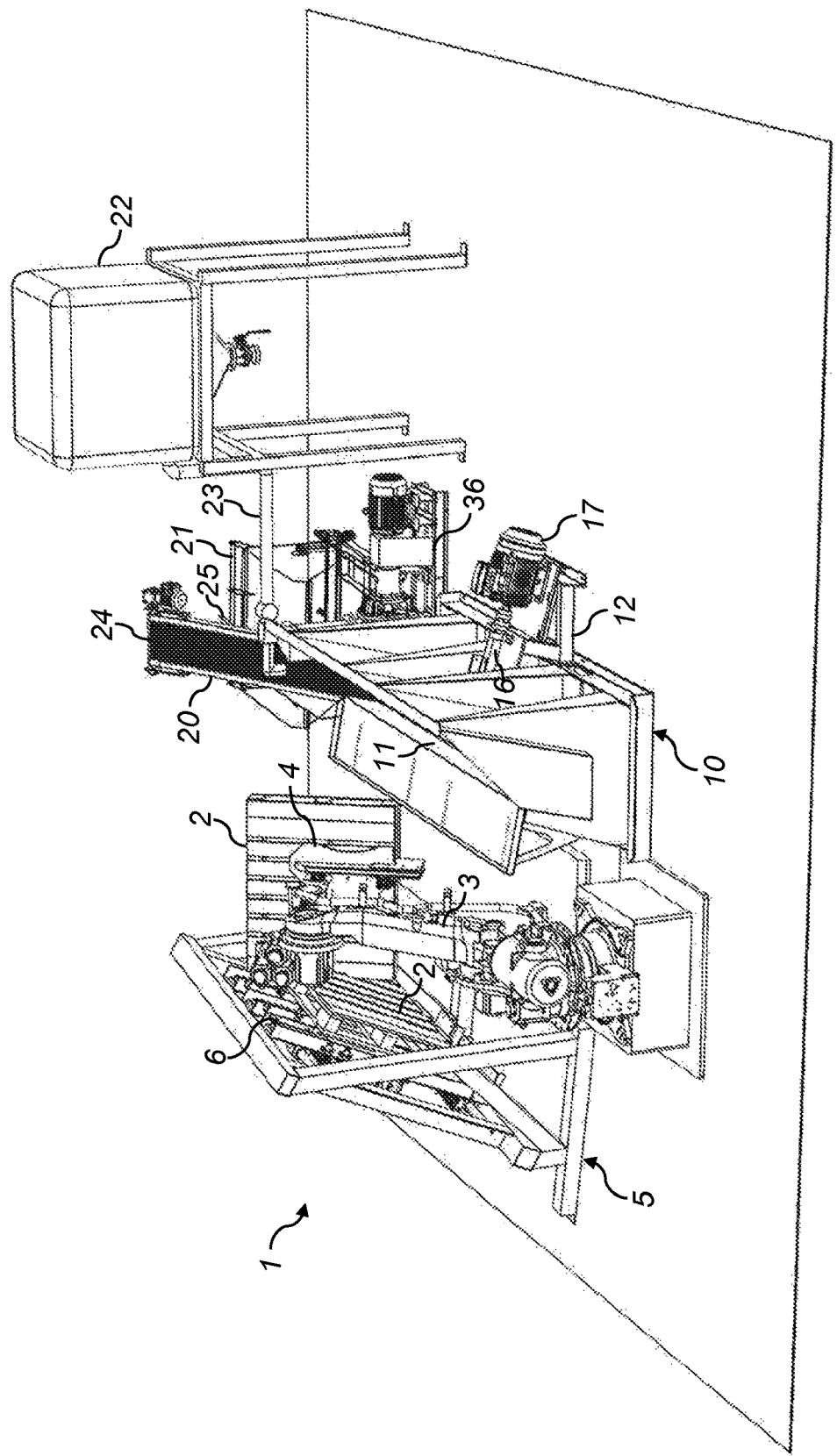
FIG. 1 is an overall perspective view showing a robot cell according to a preferred embodiment of the invention, and FIG. 2 a perspective view of just a sawing device of the robot cell of FIG. 1.

In the overall view of FIG. 1 reference number 1 generally depicts a robot cell which is arranged to handle one pallet at a time. However, as the drawings are schematic, two pallets, both enumerated 2, are shown in FIG. 1 in different positions. A first pallet 2, which is held by a gripper 4 of a multi axis robot arm 3, is shown centrally in a transition position, while a second pallet 2 is shown to the left arranged in a cutting device 5, where it could be placed and held by the robot arm 3 in order to have knives 6 of the cutting device 5 cut and remove chosen parts of the pallet 2. The cutting device 5 is essentially known from WO 2012/067581 A1 and therefore not described in further detail.

In FIG. 1, immediately to the right of the robot arm 3, a sawing device generally depicted 10 is shown. It will be described in detail below when dealing with the contents of FIG. 2. For now it suffices to note that it comprises a trough 11, which is to hold a liquid and from which a belt conveyor 20 rises towards a discarding bin 21 arranged behind the trough 11 in order to take up waste material provided by the belt conveyor 20.

Far right in FIG. 1 a liquid reservoir 22 is shown, which by a conduit 23 is connected to the trough 11. The purpose of the reservoir 22 will also be described below.

Figure 2:
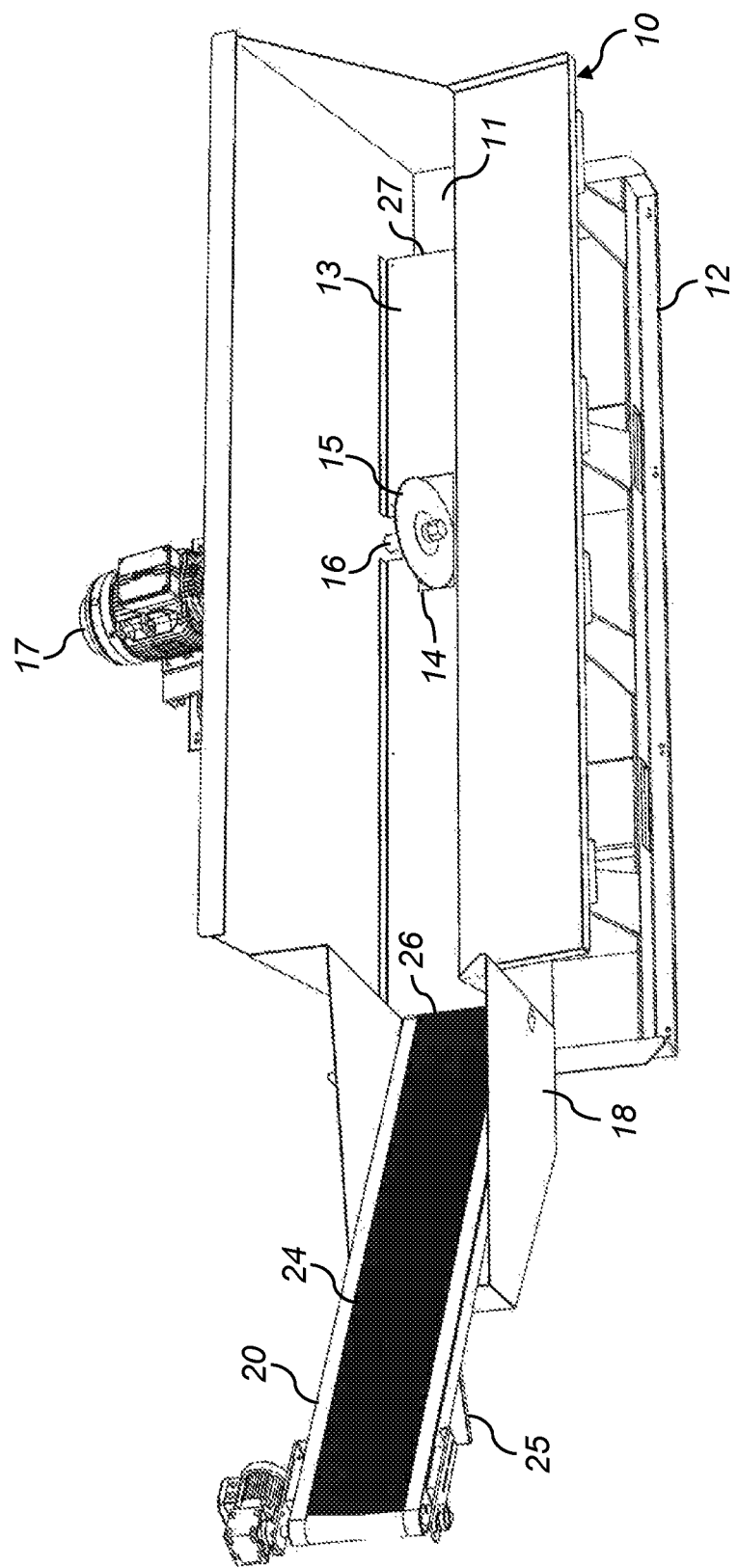

As can be seen in FIG. 2, the sawing device 10 comprises a stand 12, which supports the trough 11 mentioned before. The trough 11 is elongate and comprises a horizontal baffle 13, which divides the trough into a top portion above the baffle 13 and a bottom portion below the baffle, none of these portions being depicted in FIG. 2. Depicted is instead a central orifice 14 in the baffle 13, which connects said top and bottom portions and houses a circular saw blade 15. The saw blade 15 runs in parallel with the elongate trough 11 and is rigidly mounted on a shaft 16, which runs transversely of the trough 11. Said shaft 16 and hence the saw blade 15 are rotated by an electric motor 17 arranged on the stand 12 outside of the trough 11 and sealed in relation to the trough 11 by means of a liquid tight radial seal of a per se known and therefore not illustrated kind.

At the far end in FIG. 2, the trough comprises a projecting portion 18, which houses a first, lower end of the belt conveyor 20 mentioned before. Said first end is arranged essentially in level with the baffle 13, which terminates at a liquid outlet 26 just in front of the belt conveyor 20, that is, the baffle 13 does not extend along the entire trough 11. At the opposite end of the trough 11 the baffle 13 does not either stretch all the way but terminates at a liquid inlet 27 slightly before the trough end in question. Thus a liquid circulation path is opened, which can form a liquid stream running towards the belt conveyor 20 on top of the baffle 13 and running away from the belt conveyor 20 below the baffle 13.

The belt conveyor 20 comprises a belt 24 made of a liquid pervious material, such as a metal mesh. The belt 24, which runs about first and second rollers (not depicted), forms a top strand, that is the belt part shown in FIGS. 1 and 2, and a bottom strand, which is opposite to said top strand but not illustrated in the drawings. Shown, however, is a minor part of a scraper 25, which is arranged to free said bottom strand of the belt 24 from waste material adhering thereto, wherein said scraper 25 is arranged such that freed waste material is dropped into the discarding bin 21.

Having described essential features of the robot cell 1 above, below the purpose and function of the robot cell 1 as well as some further details will be described to further elucidate the present invention.

As indicated in the preamble, the purpose of the robot cell 1 is to render it possible to separate chosen defective parts from a pallet 2. To this a pallet 2 in a per se known way is gripped by the gripper 4 of the multi axis robot arm 3 and introduced into the robot cell 1. Inside the robot cell 1 one can choose either to use the knives 6 of the cutting device 5 or the circular saw blade 15 of the sawing device 10 or both for the separation action. In any case the pallet 2 is handled by the gripper 4 of the robot arm 3, which is to say that it is turned, held or moved to enable separation of the chosen defective parts.

When the separation action comprises use of the sawing device 10, the parts of the pallet 2 to be separated from the pallet 2 are turned downwards and a first joint of a defective part with the remainder of the pallet 2 is aligned with the saw blade 15, which according to the present invention is totally immersed in a liquid bath contained in the trough 11 of the sawing device 10. Then the pallet 2 aligned in that way is moved by the robot arm 3, such that separation of the defective pallet part is altogether performed in a liquid environment. By this no swirling around saw dust is created, no sparking is to be feared even when cutting nails, screws or staples, and noise is lowered substantially.

In order to provide for smooth operation, the trough 11 has a length which exceeds two times a maximum pallet length. In that way and by placing the saw blade 15 in a central part of the trough 11, it is rendered possible to perform a cut along the entire length of a pallet 2 in a single sweep, which runs away from the belt conveyor 20 because the saw blade 15 is turning towards it. As soon as a part is separated, it is floatingly entrained by the liquid circulated through the trough 11 and by means of a circulation pump assembly 36 flushed towards the belt conveyor 20. There the separated part and saw dust dissolved in the liquid are picked up and discarded into the discarding bin 21, wherein the scraper 25 is used to remove saw dust adhering to the belt 24 and excessive loss of liquid is avoided thanks to choice of a liquid pervious mesh material for said belt 24.

However, from time to time liquid (generally water) has to be replenished in order to keep the saw blade safely immersed. To this a liquid reservoir 22 has turned out to be beneficial, because it can be used not only for replenishing purposes, but also to hold all the liquid of the trough 11 when it has to be emptied totally out of service reasons, e.g. when the saw blade 15 has to be replaced. In that way, and by preferably arranging a filter device (not depicted in the drawings) in the circulation pump assembly 36, liquid consumption can be minimized.

The person skilled in the art can readily find out which device (cutting device 5 or sawing device 10) to use best for a separation action, which is not only dependent on the placement of a pallet part to be separated, but also on the type of pallet at hand, such as an EUR-pallet or a perimeter pallet, which is why a robot cell 1 according to the preferred embodiment comprising both devices 5 and 10 is considered extra advantageous.

The invention claimed is:

1. A robot cell comprising a multi axis robot arm, which terminates in a gripper arranged to handle a pallet, and a sawing device, which is arranged to separate a nailed pallet part from the pallet handled by said gripper, said sawing device comprises a circular saw blade totally immersed in a liquid bath, the liquid bath being contained in a trough of said sawing device, such that separation of said nailed pallet part is performed in a liquid environment, wherein a baffle is horizontally arranged in said trough, said baffle having a central orifice, wherein an upper part of said circular saw blade extends through the central orifice to perform said separation, and wherein said baffle is shorter than said trough, such that a circulating liquid stream is permitted to surface from below said baffle through an inlet upstream of said circular saw blade at a first end of said trough and is permitted to dive below said baffle through an outlet downstream of said circular saw blade at a second end of said trough.

2. The robot cell according to claim 1, wherein a belt conveyor is arranged to pick up the nailed pallet part in a floating condition separated from the pallet at said second end of said trough and to move the nailed pallet part away from said second end.

3. The robot cell according to claim 2, wherein a scraper is arranged to free a bottom strand of said belt conveyor from wet, adhering saw dust outside of said trough.

4. The robot cell according to claim 2, wherein said belt conveyor comprises a belt made of a liquid pervious mesh material.

* * * * *